Figure 1:
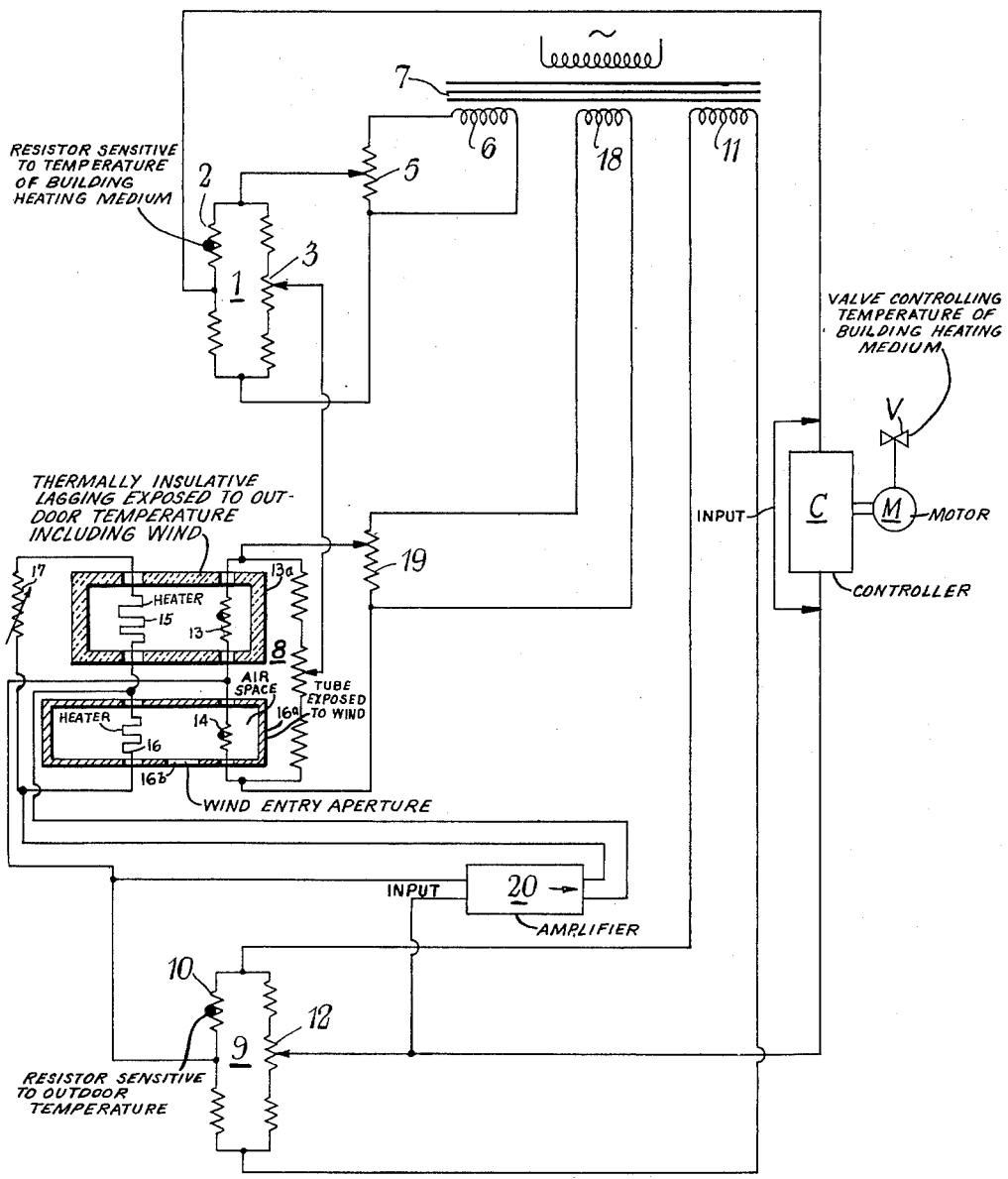

Sept. 29, 1964  F. L. F. STEGHART ETAL  3,150,826
DEVICE FOR CONTROLLING A CENTRAL HEATING SYSTEM
Filed Feb. 23, 1961  2 Sheets-Sheet 1

INVENTORS:
FRITZ LUDWIG FELIX STEGHART
PETER LESLIE KERSHAW
BY
Richardson, David and Nerdon
ATTY'S.

Sept. 29, 1964  F. L. F. STEGHART ETAL  3,150,826
DEVICE FOR CONTROLLING A CENTRAL HEATING SYSTEM
Filed Feb. 23, 1961  2 Sheets-Sheet 2

INVENTORS:
FRITZ LUDWIG FELIX STEGHART
PETER LESLIE KERSHAW
By
Richardson, David and Nardon
Attys.

United States Patent Office 3,150,826
Patented Sept. 29, 1964

3,150,826
DEVICE FOR CONTROLLING A CENTRAL HEATING SYSTEM
Fritz Ludwig Felix Steghart, St. Albans, and Peter Leslie Kershaw, Pinner, England, assignors to Satchwell Controls Limited, a company of Great Britain
Filed Feb. 23, 1961, Ser. No. 91,096
Claims priority, application Great Britain, Mar. 15, 1960, 9,117/60
8 Claims. (Cl. 236—91)

This invention concerns improvements in control devices. More specifically the invention relates to the control of a heating system for a building.

It is a known and conventional practice to control the temperature in a building by means of a thermostat or like device sensitive to the air temperature in the building, such thermostat being connected to a "controller" which in turn controls the heating fluid in the building. This prior arrangement is very suitable under certain circumstances but depends, as will be clear, upon the correct location of the thermostat for it is only in the immediate region of the thermostat that the actual temperature of the building will correspond to that which is measured and controlled.

The present invention also relates to the control of the temperature of a building by regulating the temperature of the heating fluid but in contradistinction to the accepted practice does not make use of any device sensitive to the air temperature within the building. Instead the present invention is based upon a measurement of the effective temperature of the heating fluid and the control of this temperature in accordance with the prevailing weather conditions. The term "heating fluid" is used in the widest possible sense to cover all the various sources of heat which are susceptible of control and which are used in the heating of buildings and, for example, the term includes steam, hot water, hot air, etc.

It will be understood that the heating fluid is controlled as regards its effective heating capacity or "effective" temperature and hence the control may vary its actual temperature and/or the flow rate. It is of course the "effective" temperature of the heating fluid that is measured. It should be noted however that one system of central heating depends upon the flow of hot air, the air being heated by the intermittent energisation of an electric heating element; whilst the hot air is the actual heating fluid, its effective temperature can be obtained from the percentage time of energisation of the heating element.

It will be understood the different weather conditions will have different effects upon the heat loss from the building depending upon the structure, material and size of the building and by means of suitable preset controls it is possible to compensate for the constant factors such as the nature of the building. The most important heat loss from the building is due to the outside temperature but the wind also caused an increased loss of heat and the effect of the wind may be divided into two main factors, namely conduction loss through the fabric of the building due to the wind blowing over it and the loss due to infiltration and chimney effects which are caused mainly by cracks around windows and doors and the convection effects up and down elevator shafts etc.

In the average building, the heat loss due to outside temperature is proportional to the difference between the inside and outside temperatures but the additional heat loss through the fabric of the building caused by wind increases fairly rapidly as the wind speed increases up to about 5 to 7 miles an hours (8 to 11 km. per hour) and thereafter the curve of heat loss as a function of wind velocity flattens out. On the other hand the infiltration losses are small up to a wind speed of 7 to 10 miles an hour (11 to 16 km. per hour) and then increase rapidly almost following a square law. For most buildings it is possible to consider these two losses together so that a curve of heat loss is substantially proportional to the wind speed and the slope of such a curve will depend upon the ratio of infiltration to fabric losses. However, both these losses are dependent also on the difference between the inside and outside temperatures.

Consequently the heat loss from a building may be represented by the following formula:

$$\text{Loss} = K_1(T_i - T_o) + K_2 W(T_i - T_o)$$

where $T_i$ is the temperature inside the building.
$T_o$ is the temperature outside the building.
$W$ is the wind velocity and
$K_1$ and $K_2$ are constants.

It will be apparent that in a large building it may be necessary to zone the control effect, for (North of the Equator) rooms on the North side of the building will in general be colder than rooms on the South side of the building and will be subjected to different wind effects. Consequently it should be understood that the control device of the present invention may, in a large building, conveniently be applied only to a preselected group of rooms subject to similar heat loss effects.

It is the object of the present invention to provide an improved control device for controlling the temperature in a building.

According to the present invention there is provided a control device for the temperature in a building, such control device operating upon the heating fluid and comprising means to measure the outside temperature and the effective heating fluid temperature, together with means to measure the effective wind velocity and to control the effective temperature of the heating fluid in dependence upon these factors.

According to a further aspect of the present invention there is provided a control device for controlling the temperature in a building, wherein means are provided to measure the effective temperature of the heating fluid, the outside temperature and the approximate wind velocity and to combine such three measurements at the input to a controller.

Figure 2:
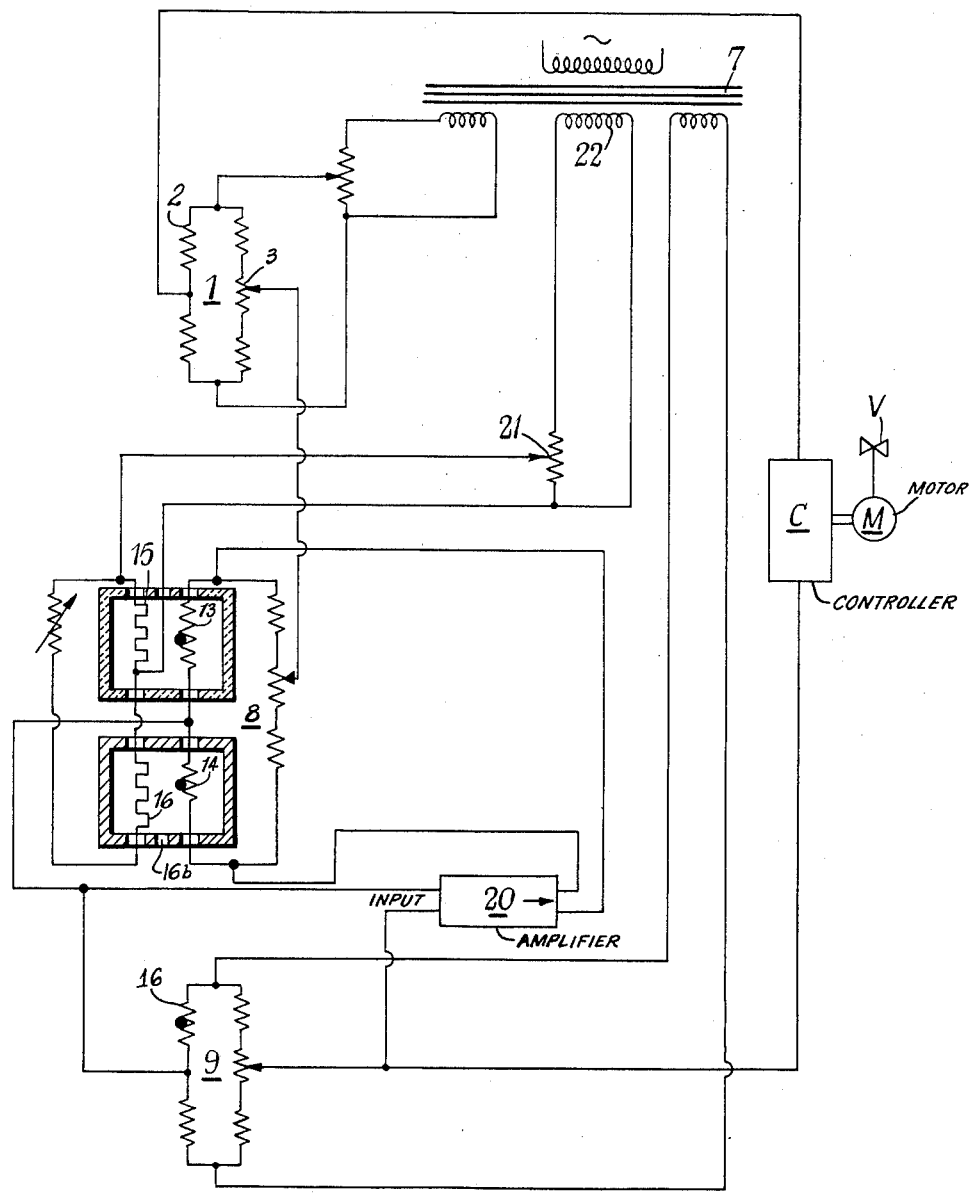

In order that the invention may more readily be understood, certain embodiments of the same will now be described with reference to the accompanying drawings, wherein:

FIGURES 1 and 2 are the circuit diagrams of two different embodiments.

In the arrangement shown in FIGURE 1, the first bridge 1 includes a resistor 2 which is sensitive to the temperature of the hot water supplied to the radiator system within a building and the bridge 1 is so adjusted that it is balanced when the hot water is at a first pre-set temperature at which it is desired that the supply of heat to the building shall commence, for example 60° F. The bridge 1 is supplied with a first pre-set voltage from a winding 6 on a transformer 7 via an attenuator 5 which is so adjusted that the proportion of the input signal supplied to the controller C by the bridge 1 is such that the temperature of the hot water does not rise to an unduly high value.

The second bridge 9 is used for measuring the heat losses from the building which are dependent upon the radiation and are thus proportional to the difference between the outside temperature and a second pre-set temperature and the third bridge 8 is used to measure the heat losses from the building which are dependent upon the speed of the wind to which the building is exposed and are thus dependent upon the product of a function of the wind speed and the difference between the outside temperature and a third pre-set temperature. The second bridge 9 includes a temperature sensitive resistor 10 exposed to the temperature outside the building and is so adjusted that it is balanced when this outside temperature has the second predetermined value. The bridge 9 is supplied with a second pre-set voltage from a winding 11 on the transformer 7 and its output is thus proportional to the difference between the outside temperature and the second predetermined temperature.

The bridge 8 includes two temperature sensitive resistors 13 and 14 which are positioned outside the building so as to be exposed to wind from all directions. The resistor 13 is heated by a heater 15 and the resistor 13 and heater 15 are enclosed in heat-insulating lagging 13a. The resistor 14 is heated by a heater 16 and the resistor 14 and heater 16 are enclosed in a tube 16a such that there is a relatively large air space between the tube and the resistor 14, the tube being provided with a hole 16b through which wind at a reduced velocity may enter and flow over the element 14. Associated with the resistors 13 and 14 are heaters 15 and 16 respectively, each heater raising the temperature of the corresponding resistor in proportion to the power supplied to that heater. A variable resistor 17 connected in series with heater 15 is so adjusted that the temperatures of resistors 13 and 14 are equal when the wind velocity is zero.

The heaters 15 and 16 are energised from the output of an amplifier 20 the input of which is energised from the output of the bridge 9. The power fed to the heaters 15 and 16 is therefore directly proportional to the difference between the outside temperature and the second predetermined temperature. The heat losses from the resistors 13 and 14 when the wind speed is zero are proportional to the difference between their temperature and the outside temperature when that difference is small and rise above this proportional relationship as this temperature difference increases. The resistances 13 and 14 are, therefore, maintained at a constant temperature when this difference is small and at approximately that constant temperature when this difference is large. This constant temperature is referred to below as "the third pre-set temperature."

When the wind speed is not zero, however, the temperature of the lagged resistor 13 falls as the wind speed increases. At the same time the temperature of resistor 14 also falls. The combined effect of the cooling of these two resistors 13 and 14 is to give an output from the bridge 8 which is a function of the wind speed when the difference between the outside temperature and the third pre-set temperature is constant.

When both the wind speed and the difference between the outside and third pre-set temperature vary the output of bridge 8 varies as the product of a function of the wind speed and the approximate difference between the outside temperature and the third pre-set temperature.

The bridges 8 and 9 are connected so that their outputs are added. The bridge 8 is fed with a third pre-set voltage from a winding 18 on the transformer 7 through an attenuator 19 and this attenuator is adjusted so that the relative magnitudes of the outputs of the bridges 8 and 9 correspond to the relative magnitudes of the radiation and wind losses from the building.

The bridges 8 and 9 are connected so that their outputs oppose the output of bridge 1 and the resultant error signal is applied to the input of a controller C, which may be of the proportional, proportional plus integral or proportional plus integral plus differential type. The output of the controller C is applied to a motor M to cause that motor to adjust a valve V controlling the supply of hot water to the radiator system in a direction to reduce the input to the controller. The temperature of the hot water is therefore adjusted until the output of bridge 1 balances the sum of the outputs of bridges 8 and 9, to compensate for the radiation and wind losses from the building.

The arrangement of FIGURE 2 differs from that of FIGURE 1 in that the heaters 15 and 16 are supplied with a third pre-set voltage from winding 22 on the mains transformer 7 via an attenuator 21 and the bridge 8 is energised from the output of amplifier 20. This arrangement produces the same effect as energising the bridge 8 with a constant voltage and energising the heaters 15 and 16 with the output of the amplifier 20, as in FIGURE 1, and the output of bridge 8 is, consequently, again proportional to the product of a function of the wind speed and the difference between the outside temperature and a third pre-set temperature. The arrangement differs, however, from that of FIGURE 1 in that the resistors 13 and 14 are not maintained at an approximately constant temperature when the wind speed is zero but are heated equally. It follows that, in the arrangement of FIGURE 2, no element is maintained at approximately the third pre-set temperature when the wind speed is zero and this temperature is, consequently, a virtual one.

We claim:

1. A temperature control device for a building heated by a heating fluid comprising: first sensing means to develop a first electrical signal in accordance with the difference between the temperature of said heating fluid and a first pre-set temperature; second sensing means to develop an electrical signal in accordance with the difference between the temperature outside said building and a second pre-set temprature; product measuring means providing a third electrical signal in accordance with the product of a function of the speed of wind outside said building and the approximate difference between the temperature outside said building and a third pre-set temperature, the wind exerting a cooling effect upon said building; means to develop an error signal representing the difference between the first and the sum of the second and third electrical signals; and temperature control means connected for response to the error signal and operative to alter the temperature of the heating fluid in a sense to reduce the error signal.

2. A device according to claim 1 wherein the first sensing means comprises a bridge circuit including in one branch a temperature sensitive element exposed to the heating effect of the heating fluid, the bridge circuit being arranged to balance when the heating fluid is at the first pre-set temperature and comprising means connected to energise the bridge circuit by a pre-set voltage.

3. A device according to claim 2 comprising means for varying the pre-set voltage.

4. A device according to claim 1 wherein the second sensing means comprises a bridge circuit including in one branch a temperature sensitive element exposed to the temperature outside said building, the bridge circuit being arranged to balance when the temperature outside said building is equal to the second pre-set temperature and comprising means connected to energise the bridge circuit by a pre-set voltage.

5. A device according to claim 1 wherein the product measuring means comprises a bridge circuit having in one branch a temperature sensitive element which is thermally lagged and exposed to temperature outside said building and in another branch a temperature sensitive element which is exposed to wind outside said building; and comprising: resistive heater means arranged to heat the temperature sensitive elements when energised; means connected for response to the second electrical signal to energise the heater means to maintain the temperature sensitive elements at approximately the third pre-set temperature when the wind speed is zero, the bridge circuit being arranged to balance when the temperature sensitive elements are at the third pre-set temperature; and means connected to energise the bridge by a pre-set voltage.

6. A device according to claim 5 comprising means for varying the pre-set voltage.

7. A device according to claim 1 wherein the product measuring means comprises a bridge circuit having in one branch a temperature sensitive element which is thermally lagged and exposed to the ambient temperature outside said building and in another branch a temperature sensitive element which is exposed to wind outside said building; and comprising: resistive heater means arranged to heat the temperature sensitive elements when energised; means connected to energise the heater by a pre-set voltage to heat the temperature sensitive elements equally, the bridge circuit being arranged to balance when the temperature sensitive elements are at the same temperature; and means connected for response to the second electrical signal to energise the bridge circuit.

8. A device according to claim 7 comprising means for varying the pre-set voltage.

References Cited in the file of this patent

UNITED STATES PATENTS

| | | |
|---|---|---|
| 2,137,059 | Moreau | Nov. 15, 1938 |
| 2,553,060 | Miner | May 15, 1951 |
| 2,905,388 | Galavics | Sept. 22, 1959 |

FOREIGN PATENTS

| | | |
|---|---|---|
| 57,237 | Netherlands | Apr. 15, 1946 |
| 388,773 | Great Britain | Feb. 20, 1933 |
| 809,203 | Great Britain | Feb. 18, 1959 |